US012780122B2

(12) United States Patent
Cai et al.

(10) Patent No.: US 12,780,122 B2
(45) Date of Patent: Nov. 3, 2026

(54) VEHICLE CONTROL APPARATUS, VEHICLE INTEGRATED/INTEGRATION UNIT, AND VEHICLE

(71) Applicant: Yinwang Intelligent Technologies Co., Ltd., Shenzhen (CN)

(72) Inventors: Jianyong Cai, Shenzhen (CN); Huiming Yang, Shanghai (CN); Yalin Liu, Shanghai (CN); Yuan Cheng, Shenzhen (CN); Xiaohua Chen, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/145,446

(22) Filed: Dec. 22, 2022

(65) Prior Publication Data

US 2023/0134322 A1 May 4, 2023

Related U.S. Application Data

(63) Continuation of application No. PCT/CN2020/098120, filed on Jun. 24, 2020.

(51) Int. Cl.
*B60R 16/023* (2006.01)
*H04L 67/12* (2022.01)

(52) U.S. Cl.
CPC ............ *B60R 16/023* (2013.01); *H04L 67/12* (2013.01)

(58) Field of Classification Search
CPC ....... B60R 16/023; B60R 16/02; H04L 67/12; H04L 2012/40273; H04L 12/40169
See application file for complete search history.

(56) References Cited

U.S. PATENT DOCUMENTS 5,973,409 A * 10/1999 Neibecker ........... B60R 16/0238 307/10.1
6,909,952 B2 * 6/2005 Mathony ............. B60R 16/0315 700/20
10,606,786 B2 3/2020 Fox et al.
10,632,942 B1 4/2020 Christie et al.
10,805,813 B2 * 10/2020 Takahashi ............. H04W 48/16
11,418,935 B2 * 8/2022 Cai ........................ B60R 16/023
11,423,715 B1 * 8/2022 Herron .................. G06F 1/1613
2005/0060070 A1 * 3/2005 Kapolka ................ G07C 5/008 701/31.4

(Continued)

FOREIGN PATENT DOCUMENTS

CN 2450705 Y 9/2001
CN 1545263 A 11/2004

(Continued)

*Primary Examiner* — Redhwan K Mawari
(74) *Attorney, Agent, or Firm* — Conley Rose, P.C.

(57) ABSTRACT

A vehicle control apparatus is applicable to an intelligent vehicle, a new energy vehicle, or the like and includes a first circuit board, on which an internal network interface is disposed, where the vehicle control apparatus communicates with an in-vehicle network of a vehicle by using the internal network interface, and a second circuit board, on which an external network interface is disposed, where the vehicle control apparatus communicates with a vehicle external network by using the external network interface.

20 Claims, 10 Drawing Sheets

(56) References Cited

U.S. PATENT DOCUMENTS

| | | | | |
|---|---|---|---|---|
| 2006/0178804 | A1* | 8/2006 | Laichinger | F02D 41/28 701/115 |
| 2008/0052435 | A1* | 2/2008 | Norwood | H05K 7/1467 710/301 |
| 2012/0299375 | A1* | 11/2012 | Saez-Zamora | H05K 7/209 307/9.1 |
| 2012/0321077 | A1 | 12/2012 | Shiota et al. | |
| 2013/0314039 | A1* | 11/2013 | Weber | B60L 53/11 320/109 |
| 2013/0321134 | A1* | 12/2013 | Frye | H04L 12/40169 340/12.32 |
| 2015/0106540 | A1 | 4/2015 | Hoffman et al. | |
| 2015/0340907 | A1 | 11/2015 | Lei | |
| 2017/0072876 | A1* | 3/2017 | Rajan | H04L 12/66 |
| 2018/0267564 | A1* | 9/2018 | Hutchins | F15B 13/08 |
| 2019/0230309 | A1* | 7/2019 | Asayama | B60R 1/27 |
| 2019/0281052 | A1* | 9/2019 | Lekkas | H04L 63/0428 |
| 2020/0031343 | A1* | 1/2020 | Ogata | G08G 1/167 |
| 2020/0125858 | A1* | 4/2020 | Bauer | B60R 16/03 |
| 2020/0168972 | A1 | 5/2020 | Dogiamis et al. | |
| 2021/0016778 | A1* | 1/2021 | Yashiro | B60W 10/04 |
| 2022/0340076 | A1* | 10/2022 | Lim | H04W 4/46 |
| 2023/0241985 | A1* | 8/2023 | Krieg | B60L 3/00 307/9.1 |
| 2023/0242054 | A1* | 8/2023 | Moss | B60L 3/0046 320/104 |

FOREIGN PATENT DOCUMENTS

| | | | |
|---|---|---|---|
| CN | 1745367 | A | 3/2006 |
| CN | 2800362 | Y | 7/2006 |
| CN | 101571957 | A | 11/2009 |
| CN | 101710725 | A | 5/2010 |
| CN | 102255282 | A | 11/2011 |
| CN | 102843231 | A | 12/2012 |
| CN | 202608764 | U | 12/2012 |
| CN | 103066662 | A | 4/2013 |
| CN | 103138350 | A | 6/2013 |
| CN | 103640494 | A | 3/2014 |
| CN | 204498143 | U | 7/2015 |
| CN | 205311506 | U | 6/2016 |
| CN | 105818761 | A | 8/2016 |
| CN | 206049553 | U | 3/2017 |
| CN | 207382349 | U | 5/2018 |
| CN | 108445795 | A | 8/2018 |
| CN | 109606285 | A | 4/2019 |
| CN | 110549942 | A | 12/2019 |
| DE | 102012014724 | B3 | 9/2013 |
| EP | 0947391 | A3 | 6/2002 |
| EP | 2107864 | A3 | 7/2010 |

* cited by examiner

VEHICLE CONTROL APPARATUS, VEHICLE INTEGRATED/INTEGRATION UNIT, AND VEHICLE

CROSS-REFERENCE TO RELATED APPLICATIONS

This is a continuation of International Patent Application No. PCT/CN2020/098120 filed on Jun. 24, 2020, which is hereby incorporated by reference in its entirety.

TECHNICAL FIELD

This disclosure relates to the vehicle field, furthermore, to a vehicle control apparatus, a vehicle integrated/integration unit (VIU), and a vehicle.

BACKGROUND

Nowadays, intelligentization, networking, electrification, and sharing have become a development trend in the vehicle field. Usually, the development trend is implemented by relying on a system with an electronic control function in a vehicle. A vehicle control apparatus that implements an electronic control function in a vehicle mainly includes a central computing platform (CCP), a domain controller (DC), an electronic control unit (ECU), and the like.

Furthermore, regardless of a type of a vehicle control apparatus, a micro processing unit (MPU), a micro control unit (MCU), an input/output (I/O) interface, and the like inside the vehicle control apparatus are all integrated onto one circuit board.

However, for vehicles of different models, different types of communications interfaces need to be configured for vehicle control apparatuses needed by the vehicles, and not all types of communications interfaces correspond to a same interface quantity. Therefore, dedicated circuit boards need to be configured for vehicles of different models, to implement control functions by using vehicle control apparatuses including the circuit boards. Universality of the vehicle control apparatus is relatively poor due to this manner in which different circuit boards need to be configured for vehicles of different models to implement control functions of vehicle control apparatuses in the vehicles.

SUMMARY

This disclosure provides a vehicle control apparatus, a vehicle control unit, and a vehicle, to improve universality of the vehicle control apparatus.

According to a first aspect, a vehicle control apparatus is provided, including a first circuit board, on which an internal network interface is disposed, where the vehicle control apparatus is communicatively connected to an in-vehicle network of a vehicle by using the internal network interface, and a second circuit board, on which an external network interface is disposed, where the vehicle control apparatus is communicatively connected to a vehicle external network by using the external network interface.

In this embodiment of this disclosure, the internal network interface of the vehicle control apparatus is configured on the first circuit board, and the external network interface of the vehicle control apparatus is configured on the second circuit board 220. In this way, different first circuit boards and a same second circuit board 220 may be configured for vehicles of different models, to avoid a case in which an internal network interface and an external network interface are configured on one circuit board in a conventional technology and consequently the entire circuit board in a vehicle control apparatus needs to be replaced for matching vehicles of different models, thereby improving universality of the vehicle control apparatus.

In a possible implementation, at least one MPU is further disposed on the second circuit board 220, and the at least one MPU is configured to process to-be-processed data in the vehicle control apparatus, and/or an MCU is further disposed on the second circuit board 220, and the MCU is configured to control a vehicle component in the vehicle.

In this embodiment of this disclosure, a computing function, a data processing function, an electronic control function, and the like that are needed by each of vehicles of different models are usually implemented by at least one MPU and/or a MCU. Therefore, the at least one MPU and/or the MCU are disposed on the second circuit board 220, to help improve an integration degree of the control apparatus and reduce circuit board costs of the vehicle control apparatus while enabling the vehicle control apparatus to have relatively high universality.

In a possible implementation, the vehicle control apparatus includes a plurality of first circuit boards, and each of the plurality of first circuit boards is communicatively connected to the second circuit board.

In this embodiment of this disclosure, the second circuit board may be communicatively connected to the plurality of first circuit boards, to help improve diversity of a connection manner of the first circuit board and the second circuit board, and increase a quantity of scenarios to which the vehicle control apparatus is applicable.

In some embodiments, the plurality of first circuit boards send vehicle data received by using the in-vehicle network to the second circuit board, and the second circuit board processes the data by using the at least one MPU.

In this embodiment of this disclosure, the data received by the plurality of first circuit boards is sent to one second circuit board for data processing, to reduce a quantity of second circuit boards in the vehicle control apparatus, thereby helping reduce costs of the vehicle control apparatus.

It should be noted that the plurality of first circuit boards may be all or some of circuit boards communicatively connected to the second circuit board. This is not limited in this embodiment of this disclosure.

In some embodiments, the second circuit board processes the to-be-processed data in the vehicle by using the at least one MPU, to obtain processed data, and the second circuit board sends the processed data to the in-vehicle network by using the plurality of first circuit boards.

In this embodiment of this disclosure, one second circuit board processes the to-be-processed data to obtain the processed data, and sends the processed data to the in-vehicle network by using the plurality of first circuit boards, to reduce a quantity of second circuit boards in the vehicle control apparatus, thereby helping reduce costs of the vehicle control apparatus.

In a possible implementation, the vehicle control apparatus includes a plurality of second circuit boards, and each of the plurality of second circuit boards is communicatively connected to the first circuit board.

In this embodiment of this disclosure, the first circuit board is communicatively connected to the plurality of second circuit boards, to improve a computing capability of the vehicle control apparatus.

In some embodiments, at least one MPU on each of the plurality of second circuit boards is configured to process data received by the first circuit board.

In this embodiment of this disclosure, the at least one MPU on each of the plurality of second circuit boards processes the data received by the first circuit board, to improve a computing capability of the vehicle control apparatus.

In some embodiments, at least one MPU on each of the plurality of second circuit boards is configured to process to-be-processed data to obtain processed data, and send the processed data to the in-vehicle network by using the first circuit board.

In this embodiment of this disclosure, the at least one MPU on each of the plurality of second circuit boards processes the data received by the first circuit board, and sends the processed data to the in-vehicle network by using the first circuit board, to improve a computing capability of the vehicle control apparatus.

In a possible implementation, an interface configured to transmit audio/video data is disposed on the second circuit board.

In this embodiment of this disclosure, the interface for transmitting the audio/video data is disposed on the second circuit board, to reduce a data volume of data transmitted between the first circuit board and the second circuit board, thereby helping reduce a requirement of data transmission between the first circuit board and the second circuit board for communication link performance.

In a possible implementation, the internal network interface includes an I/O interface configured to communicate with the vehicle component in the vehicle by using the in-vehicle network.

In a possible implementation, the internal network interface includes one or more of the following I/O interfaces: a Controller Area Network (CAN) input interface, a local interconnect network (LIN) input interface, an analog input interface, a digital input interface, a single edge nibble transmission (SENT) input interface, a Hall signal input interface, a low edge output interface, a high edge output interface, an H-bridge output interface, a brushless direct current motor (BLDCM) output interface, a current valve control interface, an Ethernet internal network interface, and a Peripheral Component Interconnect Express (PCIe) interface. The Ethernet internal network interface is an interface configured to be communicatively connected to the in-vehicle network in Ethernet interfaces.

In a possible implementation, the external network interface includes an Ethernet external network interface, and the Ethernet external network interface is an interface used during communication with the vehicle external network in the Ethernet interfaces.

In a possible implementation, an external power supply is disposed on the first circuit board, and the external power supply is configured to supply power to an electronic element other than electronic elements on the first circuit board and the second circuit board in the vehicle.

In this embodiment of this disclosure, the external power supply is disposed on the first circuit board, to balance temperatures of the circuit boards in the vehicle control apparatus.

In a possible implementation, the vehicle control apparatus further includes a power supply circuit board, and an external power supply in the power supply circuit board is configured to supply power to an electronic element other than electronic elements on the first circuit board and the second circuit board in the vehicle.

In this embodiment of this disclosure, the power supply is disposed on an independent power supply circuit board, and if the power supply is faulty, only the power supply circuit board may be replaced, to reduce later maintenance costs.

According to a second aspect, a VIU of a vehicle is provided, including the vehicle control apparatus according to any one of the first aspect or the possible implementations.

In a possible implementation, the VIU is configured to implement some or all electronic control functions of a plurality of vehicle components in the vehicle.

According to a third aspect, a vehicle is provided, including the vehicle control apparatus according to any one of the first aspect or the possible implementations or the VIU according to the second aspect or the possible implementation.

DESCRIPTION OF EMBODIMENTS

The following describes technical solutions in this disclosure with reference to accompanying drawings.

For ease of understanding, a VIU in the embodiments of this disclosure is first described. The VIU is also referred to as a vehicle integrated/integration unit. In a system implementing an electronic control function in a vehicle, the VIU provides, for a plurality of vehicle components, some or all data processing functions or control functions needed by the vehicle components. The following describes functions of the VIU in three aspects. It should be understood that the VIU may have one or more of the following plurality of functions.

1. Electronic control function. That is, the VIU is configured to implement some or all electronic control functions provided by ECUs inside the vehicle components, for example, a control function needed by a vehicle component, and for another example, a data processing function needed by a vehicle component.

2. Same function as a gateway. That is, the VIU may further have some or all same functions as the gateway, for example, a protocol conversion function, a protocol encapsulation and forwarding function, and a data format conversion function.
3. Data processing function cross vehicle components. That is, the VIU performs processing or computing on data obtained from actuators in a plurality of vehicle components.

It should be noted that the data in the foregoing function may include running data of the actuators in the vehicle components, for example, motion parameters of the actuators or working statuses of the actuators. Alternatively, the data in the foregoing function may be data collected by using data collection units (for example, sensitive elements) in the vehicle components, for example, road information or weather information that is of a road on which the vehicle is traveling and that is collected by using the sensitive elements of the vehicle. This is not limited in the embodiments of this disclosure.

Figure 1:
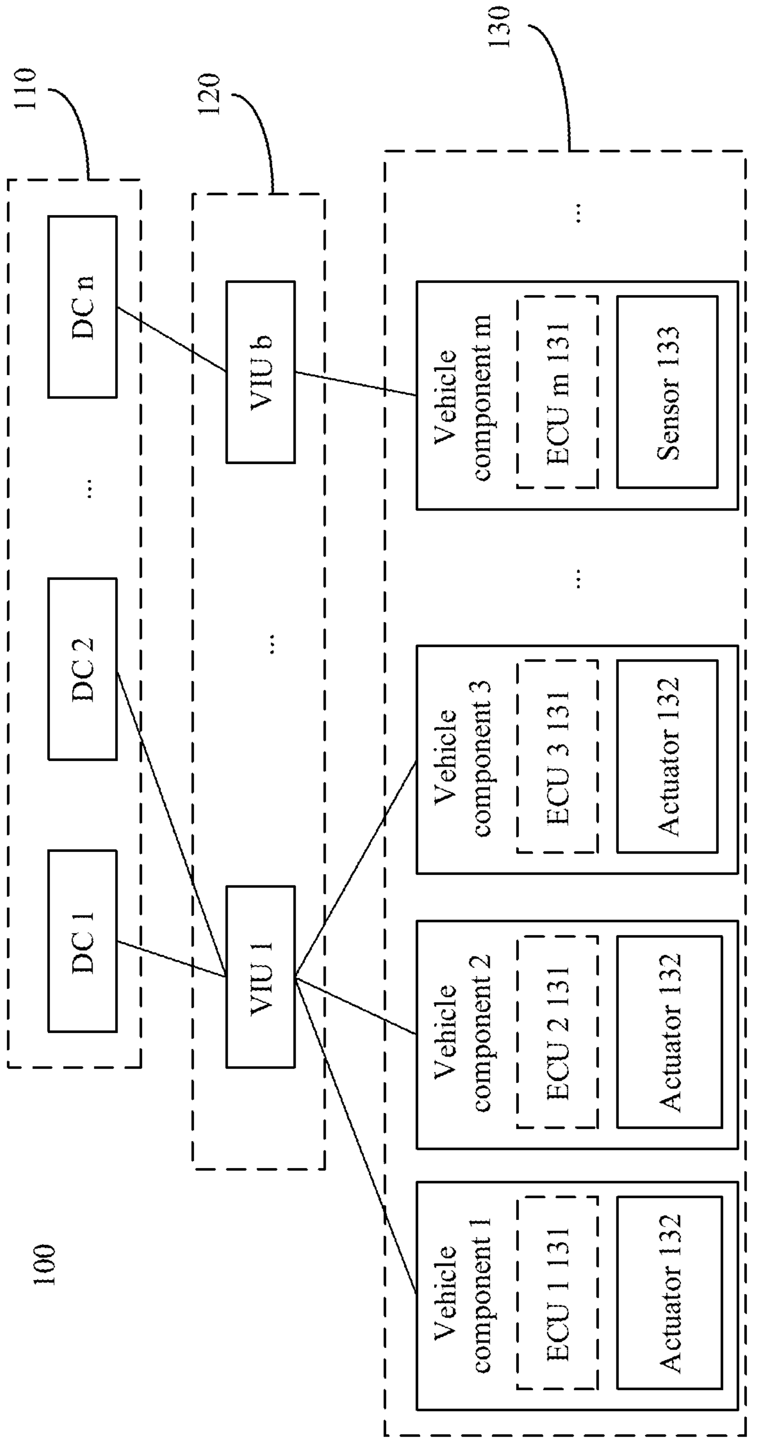
FIG. 1 is a schematic diagram of a system implementing an electronic control function in a vehicle according to an embodiment of this disclosure.

The following describes, with reference to FIG. 1, a schematic diagram of a system implementing an electronic control function in a vehicle. It should be noted that the system implementing the electronic control function in the vehicle may be applied to an intelligent vehicle, a new energy vehicle, a conventional vehicle, or the like. The new energy vehicle includes a battery electric vehicle, an extended-range electric vehicle, a hybrid vehicle, a fuel cell vehicle, or another new energy vehicle. The conventional vehicle includes a gasoline vehicle, a diesel vehicle, or the like.

FIG. 1 is a schematic diagram of a system 100 implementing an electronic control function in a vehicle. The system 100 shown in FIG. 1 includes n DCs 110, b VIUs 120, and m vehicle components 130, where n, b, and m are positive integers.

Each of the DCs 110 is configured to manage a function domain in the vehicle, that is, the DC is communicatively connected to a plurality of vehicle components located in the function domain. The DC 110 is configured to control a vehicle component in a corresponding function domain, or provide a data processing function for a vehicle component in a corresponding function domain.

Usually, each function domain has an independent domain controller, namely, DC. The DC in the vehicle may include a self-driving domain controller, a cockpit domain controller (CDC), a vehicle domain controller (VDC), or the like.

The self-driving domain controller is configured to provide a service for a vehicle component implementing a self-driving function. The vehicle component implementing the self-driving function includes a monocular camera, a binocular camera, a millimeter wave radar, a laser radar, an ultrasonic radar, or the like.

It should be noted that the function of the self-driving domain controller may be implemented by using a mobile data center (MDC).

The CDC is configured to provide a service for a vehicle component in a cockpit domain. The vehicle component in the cockpit domain includes a head up display, an instrument display, a radio, a navigator, a camera, or the like.

The VDC is configured to provide services for a vehicle component in a vehicle body domain and a vehicle component in a chassis domain. The vehicle component in the vehicle body domain includes a door and window lifting controller, an electric rearview mirror, an air conditioner, a central door lock, or the like. The vehicle component in the chassis domain includes a vehicle component in a braking system, a vehicle component in a steering system, or a vehicle component in an acceleration system, such as an accelerator.

The VIU 120 is communicatively connected to a plurality of vehicle components 130, and is communicatively connected to a DC in the vehicle. For example, in FIG. 1, a VIU 1 is communicatively connected to a vehicle component 1, a vehicle component 2, and a vehicle component 3, and the VIU 1 is communicatively connected to a DC 1 and a DC 2.

The vehicle component 130 includes an actuation element. The actuation element is configured to implement a specific function. The actuation element may be, for example, a sensor 133 or an actuator 132 in the vehicle. In some embodiments, the vehicle component 130 may further include an ECU 131. The vehicle component 130 may include one or more of the following vehicle components: a vehicle component that has a partial or complete ECU function, and a vehicle component that has no electronic control function.

The vehicle component 130 that has a complete electronic control function may be understood as follows. The vehicle component 130 may implement, by using an ECU 131 in the vehicle component 130, all electronic control functions needed by the vehicle component 130.

The vehicle component 130 that has a partial electronic control function may be understood as follows some electronic control functions needed by the vehicle component 130 are implemented by an ECU in the vehicle component 130, and the other electronic control functions needed by the vehicle component 130 are implemented by a VIU.

The vehicle component 130 that has no electronic control function may be understood as follows. The vehicle component 130 has no ECU that implements the electronic control function, and all electronic control functions needed by the vehicle component 130 are implemented by a VIU.

The ECU 131 is located inside a vehicle component, and is configured to provide an electronic control function for the vehicle component, for example, an ECU in a wiper, or an ECU located in a door.

The electronic control function mainly includes a logical control function and a data processing function. The logic control function includes controlling, based on obtained control information, a vehicle component to perform an operation, for example, controlling an action of the wiper based on control information, and for another example, controlling an on/off status of a door lock based on control information. The data processing function includes processing to-be-processed data in a vehicle component, for example, performing data processing on rain amount information collected by using a sensitive element of the wiper, to determine a working status of the wiper, where the working status includes a working frequency or an on/off status of the wiper, and for another example, performing data processing on fingerprint information obtained from the door by using a sensitive element of the door lock, to determine an on/off status information of the door.

It should be noted that, unless otherwise specified, any ECU in this embodiment of this disclosure is an electronic control element located in a vehicle component, and is different from an engine control unit in a conventional technology. The engine control unit is located outside a plurality of vehicle components in an engine system, and is configured to control the plurality of vehicle components in the engine system. The engine control unit may be considered as an independent centralized controller. However, the ECU in this embodiment of this disclosure, namely, the following ECU, is an ECU located inside a vehicle component, and may be, for example, an ECU inside each of a plurality of vehicle components in an engine system.

It should be noted that the communicative connection may be understood as a wireless connection or a wired connection for information transmission. This is not limited in this embodiment of this disclosure. It may be understood that the wireless connection is that the VIU is communicatively connected to another unit in the vehicle without using a bus. For example, BLUETOOTH communication or WI-FI communication may be used. It may be understood that the wired connection is that the VIU is communicatively connected to another unit in the vehicle based on a bus, an Ethernet connection, or the like. For example, a CAN bus, a LIN bus, a PCIe, or an Ethernet communications technology may be used.

In some embodiments, the VIU may be communicatively connected to one DC in the vehicle. For example, as shown in FIG. 1, a VIU b is communicatively connected to a DC n. Alternatively, the VIU may be communicatively connected to a plurality of DCs in the vehicle. For example, as shown in FIG. 1, the VIU 1 may be communicatively connected to both the DC 1 and the DC 2.

In the VIU described above or another apparatus that has a control function in the vehicle, an MPU, an MCU, an I/O interface, and the like are all integrated onto one circuit board. However, for vehicles of different models, different types of communications interfaces need to be configured for vehicle control apparatuses needed by the vehicles, and not all types of communications interfaces correspond to a same interface quantity. Therefore, dedicated circuit boards need to be configured for vehicles of different models, to implement control functions by using vehicle control apparatuses including the circuit boards. Universality of the circuit board in the vehicle control apparatus is relatively poor due to this manner in which different circuit boards need to be configured for vehicles of different models to implement control functions of vehicle control apparatuses.

For example, in a vehicle of a model #1, N CAN bus communications interfaces need to be configured on a circuit board of a vehicle control apparatus, and M LIN communications interfaces need to be configured in the vehicle control apparatus, and in a vehicle of a model #2, Q CAN bus communications interfaces and P LIN communications interfaces need to be configured on a circuit board of a vehicle control apparatus. M, N, Q, and P are different integers. In this way, dedicated circuit boards need to be configured for the vehicle control apparatus in the vehicle of the model #1 and the vehicle control apparatus in the vehicle of the model #2.

The applicant finds that, in vehicles of different models, mainly due to different in-vehicle network (or vehicle internal network) configuration manners, internal network interfaces communicatively connected to in-vehicle networks on circuit boards of vehicle control apparatuses are configured in different manners, and consequently circuit boards of vehicle control apparatuses in vehicles of different models cannot be commonly used. However, due to similar external network configuration manners, types or quantities of external network interfaces that need to be communicatively connected to vehicle external networks on circuit boards of vehicle control apparatuses in vehicles of different models are approximately the same. Therefore, to improve universality of the vehicle control apparatus, this disclosure proposes a hardware architecture of a new vehicle control apparatus. The foregoing internal network interface and external network interface are separately configured on different circuit boards. In this way, for vehicles of different models, only a circuit board (the following first circuit board 210) on which the internal network interface is located is replaced, and a circuit board (the following second circuit board 220) on which the external network interface is located may be commonly used, to improve universality of the vehicle control apparatus.

Figure 2:
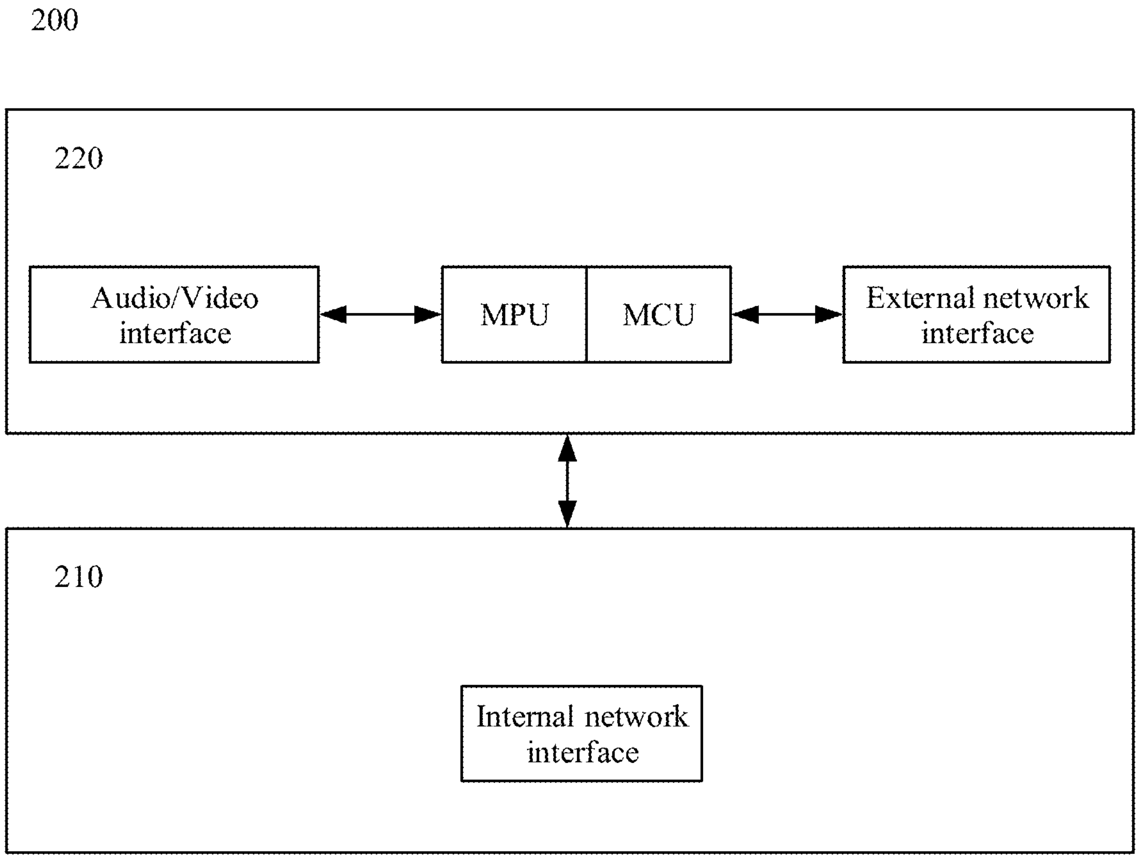
FIG. 2 is a schematic diagram of a vehicle control apparatus according to an embodiment of this disclosure.

FIG. 2 is a schematic diagram of a vehicle control apparatus according to an embodiment of this disclosure. A vehicle control apparatus 200 shown in FIG. 2 includes a first circuit board 210 and a second circuit board 220. The first circuit board 210 and the second circuit board 220 are two separately disposed circuit boards.

An internal network interface is deposed on the first circuit board 210. The vehicle control apparatus is communicatively connected to an in-vehicle network of a vehicle by using the internal network interface.

The in-vehicle network may be understood as a mesh structure obtained by connecting communicative connection cables between a sensor, a controller, and an actuator inside the vehicle. Therefore, the in-vehicle network is also referred to as a vehicle internal network. For example, the in-vehicle network may include a network such as a CAN, a LIN, or media oriented systems transport (MOST).

The internal network interface is an interface configured to be communicatively connected to a vehicle component in the vehicle by using the in-vehicle network. In some embodiments, the internal network interface may include one or more of the following I/O interfaces: a CAN input interface, an LIN input interface, an analog signal input interface, a digital signal input interface, a SENT input interface, a Hall signal input interface, a low edge output interface, a high edge output interface, an H-bridge output interface, a BLDCM output interface, a current valve control interface, an Ethernet internal network interface, and a PCIe interface. The Ethernet internal network interface is an interface communicatively connected to the in-vehicle network in Ethernet interfaces.

That the vehicle control apparatus is communicatively connected to an in-vehicle network of a vehicle by using the internal network interface includes that the vehicle control apparatus performs data transmission with the in-vehicle network by using the internal network interface, or may include that the vehicle control apparatus performs control signaling transmission with the in-vehicle network by using the internal network interface. The transmission may be interpreted as receiving and/or sending.

An external network interface is disposed on the second circuit board 220. The vehicle control apparatus is communicatively connected to a vehicle external network by using the external network interface.

The vehicle external network is relative to the in-vehicle network, and is a network used by the vehicle to be communicatively connected to an external communications device of the vehicle. For example, the vehicle external network may be a wide area network (WAN) such as a 4th generation (4G) communications network or a 5th generation (5G) communications network.

The external network interface is a communications interface used by the vehicle to communicate with the external communications device by using the external network. For example, the external network interface may be an Ethernet external network interface, that is, an interface used for communication with the vehicle external network in the Ethernet interfaces. In some embodiments, the external network interface may be an interface used by the vehicle control apparatus to be communicatively connected to an in-vehicle telematics BOX (T-BOX).

That the vehicle control apparatus is communicatively connected to an external network by using the external network interface includes that the vehicle control apparatus performs data transmission with the external network by using the external network interface, or may include that the vehicle control apparatus performs control signaling transmission with the external network by using the external network interface. The transmission may be interpreted as receiving and/or sending.

It should be noted that the internal network interface on the first circuit board 210 is not disposed on the second circuit board 220, and correspondingly the external network interface on the second circuit board 220 is not disposed on the first circuit board 210, to implement physical isolation between the internal network interface and the external network interface.

Usually, a computing function and a control function of each of circuit boards of vehicle control apparatuses in vehicles of different models are implemented by using an MCU and an MPU in the circuit board. Therefore, the MCU and the MPU may be disposed on the second circuit board 220. In this way, the second circuit board 220 is still applicable to vehicles of different models. In the case, the second circuit board 220 may also be referred to as a "computing board", and the first circuit board 210 may also be referred to as an "I/O board".

That is, at least one MPU is further disposed on the second circuit board 220, and the at least one MPU is configured to process to-be-processed data in the vehicle, and/or an MCU is further disposed on the second circuit board, and the MCU is configured to control the vehicle component in the vehicle.

The to-be-processed data may be to-be-processed data obtained by using the internal network interface on the first circuit board 210, or the to-be-processed data may be data obtained by the second circuit board 220 by using the external network interface, or the to-be-processed data may be data that needs to be sent by the second circuit board 220 by using the internal network interface on the first circuit board 210, or the to-be-processed data may be data that needs to be sent by the second circuit board 220 by using the external network interface. This is not limited in this embodiment of this disclosure.

Although an audio/video interface also belongs to the internal network interface, because a very large data volume of audio/video data needs to be transmitted to the MPU for data processing in the vehicle, to prevent the audio/video interface from being disposed on the first circuit board 210 to cause heavy burden on a communicative connection between the first circuit board 210 and the second circuit board 220, the audio/video interface may be disposed on the second circuit board 220. Certainly, if a problem such as a transmission burden of the communicative connection is not considered, the audio/video interface may be alternatively disposed on the first circuit board 210. An audio/video interface that is relatively commonly used in a vehicle is a low voltage differential signal (LVDS) interface.

In some embodiments, the first circuit board 210 may be connected to the second circuit board 220 by using a communications bus, for example, by using a high-speed communications bus, to facilitate data and control information transmission.

In some embodiments, a local area network switch (LSW) may be further disposed on the first circuit board 210, and the communications bus between the first circuit board 210 and the second circuit board 220 may be connected to the LSW on the first circuit board 210. In some embodiments, the communications bus may be a high-speed communications bus, for example, a PCIe bus or a bus based on a reduced gigabit media independent interface (RGMII).

Figure 3:
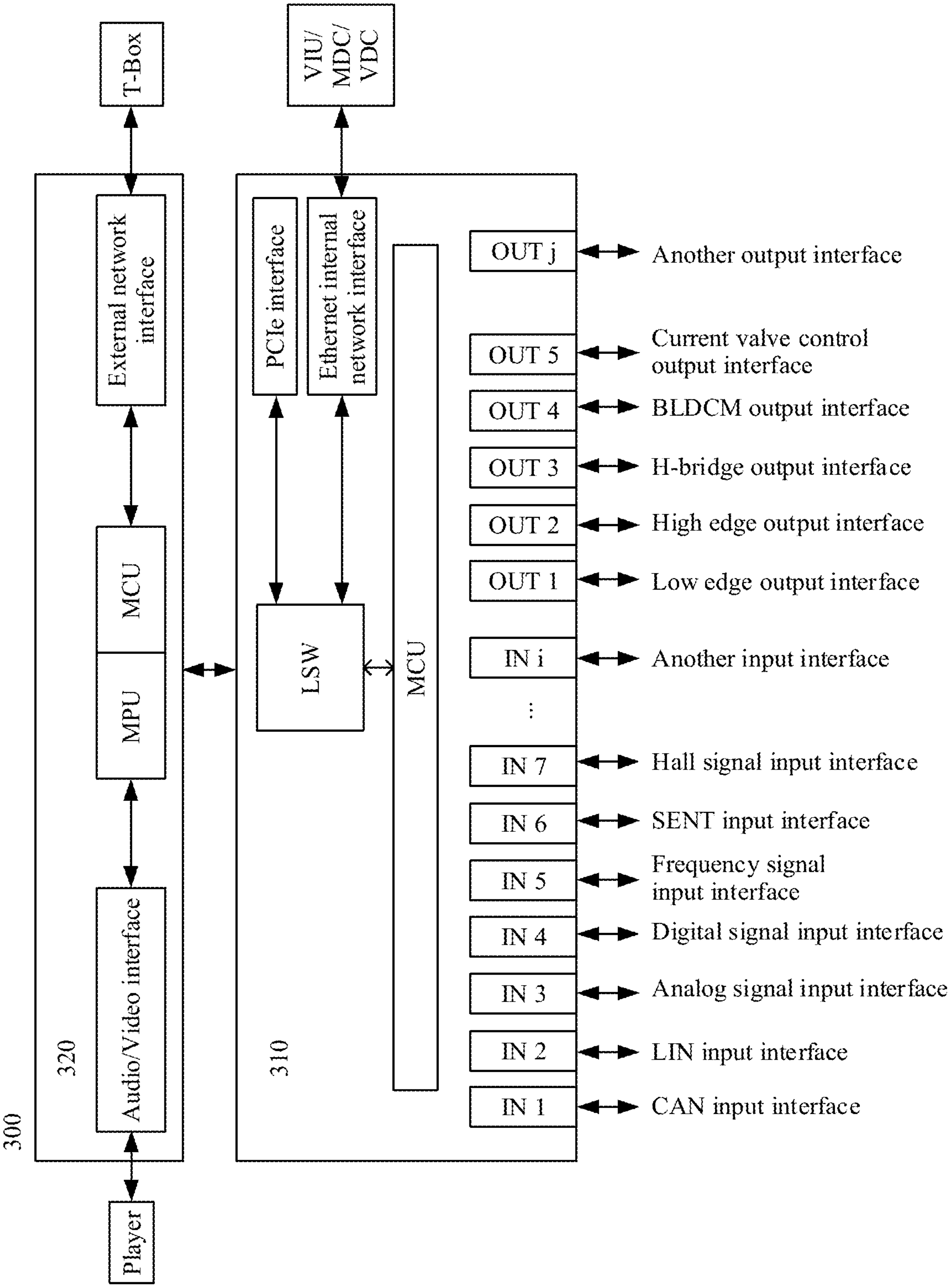
FIG. 3 is a schematic diagram of a vehicle control apparatus according to an embodiment of this disclosure.

The following uses a vehicle control apparatus shown in FIG. 3 as an example to describe a vehicle control apparatus in another embodiment of this disclosure. FIG. 3 is a schematic diagram of a vehicle control apparatus according to an embodiment of this disclosure. A vehicle control apparatus 300 shown in FIG. 3 includes a first circuit board 310 and a second circuit board 320. The second circuit board 320 has a similar circuit board structure to the foregoing second circuit board 220. For brevity, details are not described herein.

An LSW, an MCU, and an I/O interface are disposed on the first circuit board 310. The I/O interface includes i input interfaces, j output interfaces, a PCIe interface, and an Ethernet internal network interface, where i and j are positive integers. In some embodiments, the i input interfaces may include a CAN input interface, a LIN input interface, an analog input interface, a digital input interface, a SENT input interface, a Hall signal input interface, and another input interface. The j output interfaces may include a low edge output interface, a high edge output interface, an H-bridge output interface, a BLDCM output interface, a current valve control interface, and another output interface.

In some embodiments, the Ethernet internal network interface may be connected to another vehicle control apparatus. For example, the vehicle control apparatus 300 may be connected to another vehicle control apparatus such as a VIU, an MDC, and a VDC by using the Ethernet internal network interface.

The I/O interface is configured to obtain different types of signals or data from an in-vehicle network, and send the obtained signals or data to the second circuit board 320 for data processing by using the LSW. Alternatively, the I/O interface is configured to obtain to-be-transmitted data from the second circuit board 320 by using the LSW, and transmit, by using the I/O interface, the to-be-transmitted data in the second circuit board 320 to an in-vehicle network, and transmit the data to another device by using the in-vehicle network.

It should be noted that the MCU on the first circuit board 310 may be understood as a control unit included on the circuit board, and has a similar function as a control unit on a conventional circuit board. For brevity, details are not described herein.

It should be further noted that correspondences, shown in FIG. 3, between the i input interfaces and the j output interfaces and various types of input interfaces and output interfaces are merely for ease of understanding, and are not limited in this embodiment of this disclosure.

The foregoing describes a disposition manner of the first circuit board and the second circuit board in the embodiments of this disclosure with reference to FIG. 2. The following describes a connection manner of the first circuit board 310 and the second circuit board 320 with reference to FIG. 4 to FIG. 6. It should be noted that in addition to the manner, shown in FIG. 3, in which the first circuit board and the second circuit board are connected in a one-to-one correspondence, a common connection manner of the first circuit board 310 and the second circuit board 320 further includes the following connection manner 1 to connection manner 3. In addition, the following uses only the first circuit board 310 and the second circuit board 320 as an example to describe the connection manner. The connection manner in the embodiments of this disclosure is applicable to any first circuit board and second circuit board, for example, the first circuit board 210 and the second circuit board 220, in this disclosure. For functions of units disposed in the circuit boards, refer to the description in this disclosure. For brevity, details are not described below again.

Connection manner 1: A first circuit board is connected to a plurality of second circuit boards. Vehicles in a market have different automation degrees, and a vehicle of each model requires a different computing capability. Therefore, a plurality of second circuit boards 320 may be configured for a vehicle control apparatus based on a computing capability of a vehicle.

Figure 4:
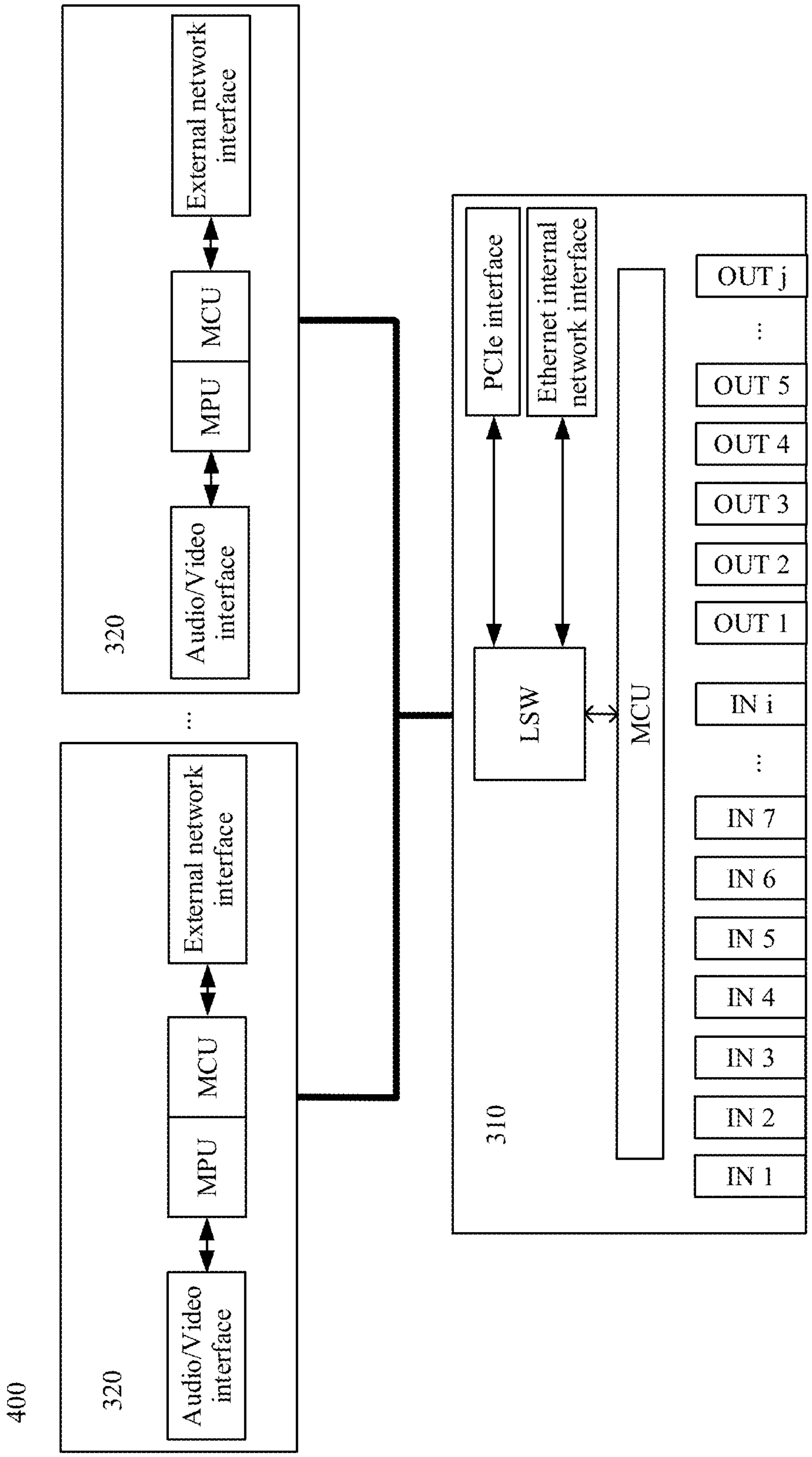
FIG. 4 is a schematic diagram of a connection manner of a first circuit board and a second circuit board according to an embodiment of this disclosure.

FIG. 4 is a schematic diagram of a connection manner 1 of a first circuit board and a second circuit board according to an embodiment of this disclosure. In a vehicle control apparatus 400 shown in FIG. 4, a plurality of second circuit boards 320 and one first circuit board 310 are disposed, and the plurality of second circuit boards 320 may be connected to the first circuit board 310 by using a communications bus. In some embodiments, the communications bus may be a high-speed communications bus, for example, a PCIe bus or a bus based on an RGMII.

At least one MPU on each of the plurality of second circuit boards 320 is configured to process data received by the first circuit board 310. Alternatively, at least one MPU on each of the plurality of second circuit boards 320 is configured to process to-be-processed data to obtain processed data, and send the processed data to an in-vehicle network by using the first circuit board 310, and send the processed data to another device in the vehicle.

It should be noted that, an external network interface may be disposed on only one of the plurality of second circuit boards 320, and all the other second circuit boards 320 may be communicatively connected to an external network by using the external network interface. Certainly, an external network interface may be disposed on each of the plurality of second circuit boards 320. In this way, each second circuit board 320 may be communicatively connected to an external network by using the external network interface of the second circuit board 320. This is not limited in this embodiment of this disclosure.

It should be further noted that, an audio/video interface may be disposed on only one of the plurality of second circuit boards 320, and all the other second circuit boards 320 may be communicatively connected to a player by using the audio/video interface. Certainly, an audio/video interface may be disposed on each of the plurality of second circuit boards 320. In this way, each second circuit board 320 may be communicatively connected to a player by using the audio/video interface of the second circuit board 320. This is not limited in this embodiment of this disclosure.

Connection manner 2: A second circuit board is connected to a plurality of first circuit boards. With an increasingly high vehicle automation degree, different types of vehicle components may be added and need to be controlled. In this case, based on an original vehicle control apparatus, a first circuit board may be added to connect a vehicle component and a second circuit board, and the second circuit board controls the added vehicle component.

Figure 5:
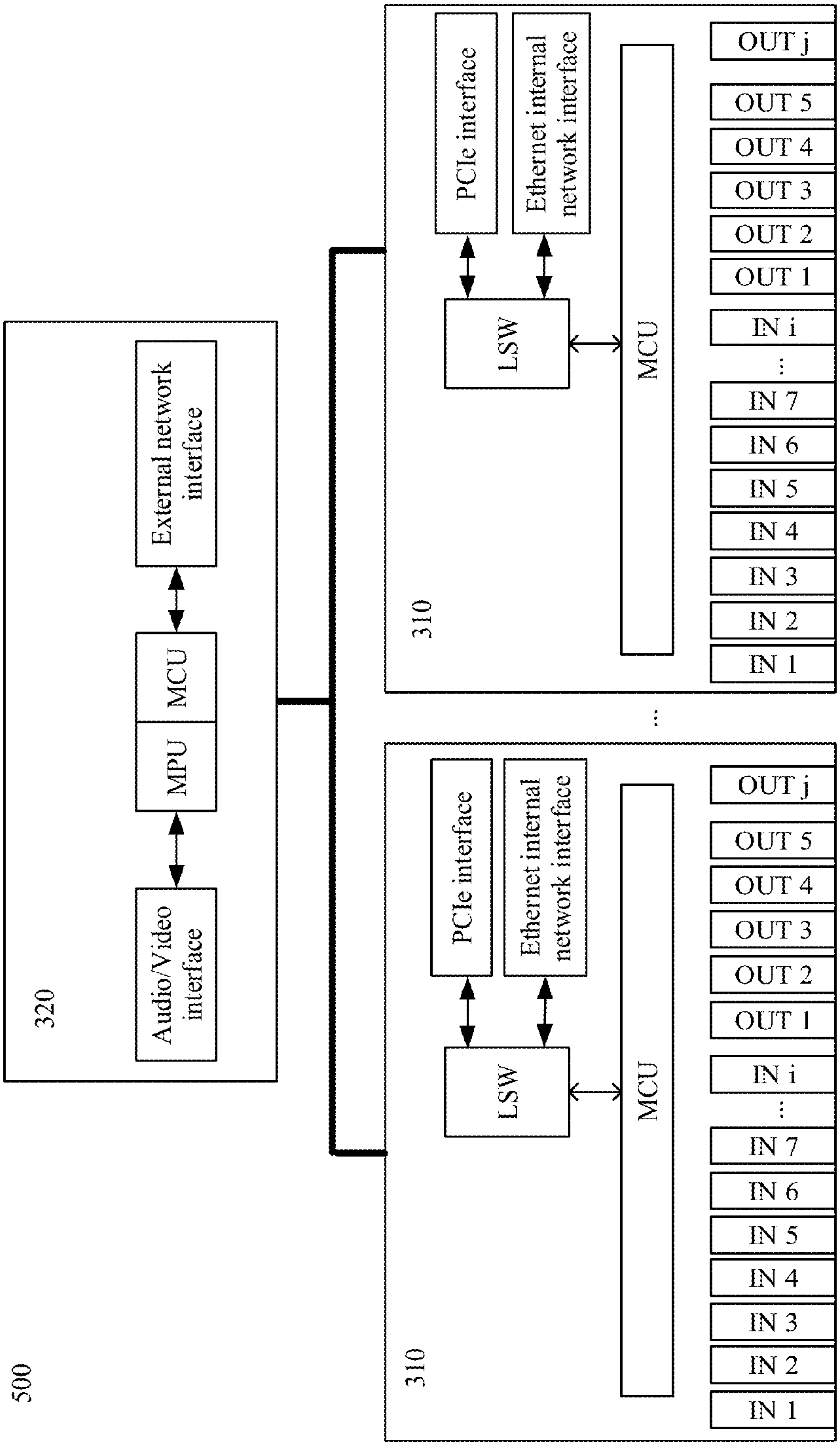
FIG. 5 is a schematic diagram of a connection manner of a first circuit board and a second circuit board according to an embodiment of this disclosure.

FIG. 5 is a schematic diagram of a connection manner 2 of a first circuit board and a second circuit board according to an embodiment of this disclosure. In a vehicle control apparatus 500 shown in FIG. 5, a plurality of first circuit boards 310 and one second circuit board 320 are disposed, and the plurality of first circuit boards 310 may be connected to the second circuit board 320 by using a communications bus. In some embodiments, the communications bus may be a high-speed communications bus, for example, a PCIe bus or a bus based on an RGMII.

The plurality of first circuit boards 310 send vehicle data received by using an in-vehicle network to the second circuit board 320, and the second circuit board 320 processes the data by using at least one MPU. Alternatively, the second circuit board 320 processes to-be-processed data in the vehicle by using at least one MPU, to obtain processed data, and the second circuit board 320 sends the processed data to an in-vehicle network by using the plurality of first circuit boards 310, and sends the processed data to another device in the vehicle by using the in-vehicle network.

Connection manner 3: Each of a plurality of second circuit boards is connected to some or all of a plurality of first circuit boards. With an increasingly high vehicle automation degree, different types of vehicle components may be added and need to be controlled, and a computing capability of a vehicle control apparatus needs to be improved. In this case, based on the original vehicle control apparatus, a first circuit board and a second circuit board may be added, that is, one vehicle control apparatus may include a plurality of second circuit boards and a plurality of first circuit boards.

Figure 6:
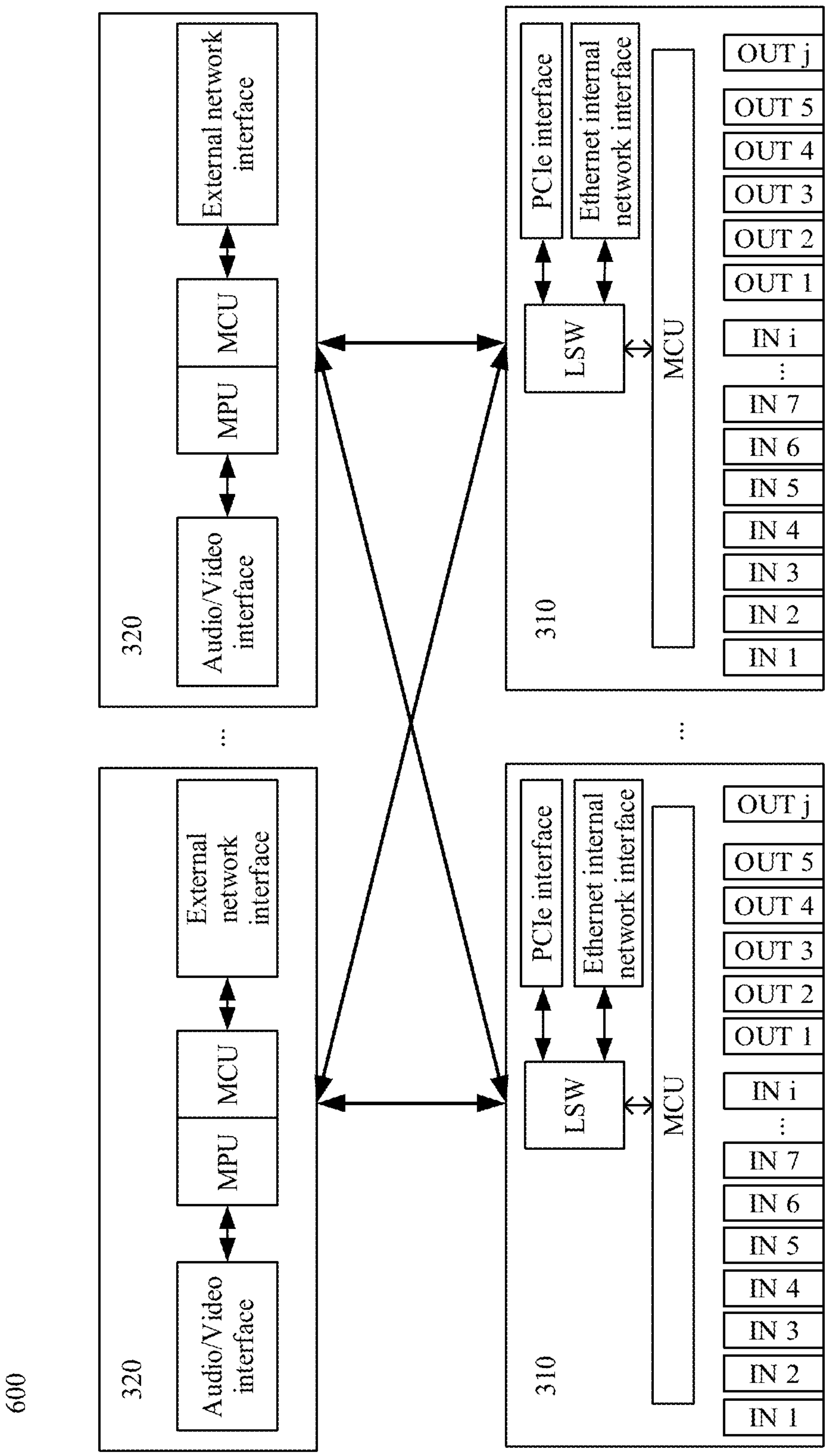
FIG. 6 is a schematic diagram of a connection manner of a first circuit board and a second circuit board according to an embodiment of this disclosure.

FIG. 6 is a schematic diagram of a connection manner 3 of a first circuit board and a second circuit board according to an embodiment of this disclosure. In a vehicle control apparatus 600 shown in FIG. 6, a plurality of first circuit boards 310 and a plurality of second circuit boards 320 are disposed, and each of the plurality of first circuit boards 310 may be connected to the plurality of second circuit boards 320 by using a communications bus. In some embodiments, the communications bus may be a high-speed communications bus, for example, a PCIe bus or a bus based on an RGMII.

Each of the plurality of first circuit boards 310 sends, to the plurality of second circuit boards 320 to which the first circuit board 310 establishes communicative connections, vehicle data received by using an in-vehicle network, and the plurality of second circuit boards 320 each process the data by using at least one MPU. Alternatively, one of the plurality of second circuit boards 320 processes, by using at least one MPU, to-be-processed data in the vehicle to obtain processed data, and the second circuit board 320 sends the processed data to an in-vehicle network by using the corresponding plurality of first circuit boards 310 to which the second circuit board 320 establishes communicative connections, and sends the processed data to another device in the vehicle by using the in-vehicle network.

It should be noted that, an external network interface may be disposed on only one of the plurality of second circuit boards 320, and all the other second circuit boards 320 may be communicatively connected to an external network by using the external network interface. Certainly, an external network interface may be disposed on each of the plurality of second circuit boards 320. In this way, each second circuit board 320 may be communicatively connected to an external network by using the external network interface of the second circuit board 320. This is not limited in this embodiment of this disclosure.

It should be further noted that, an audio/video interface may be disposed on only one of the plurality of second circuit boards 320, and all the other second circuit boards 320 may be communicatively connected to a player by using the audio/video interface. Certainly, an audio/video interface may be disposed on each of the plurality of second circuit boards 320. In this way, each second circuit board 320 may be communicatively connected to a player by using the audio/video interface of the second circuit board 320. This is not limited in this embodiment of this disclosure.

Usually, an internal power supply may be further disposed in the vehicle control apparatus, to supply power to electronic elements on the first circuit board and the second circuit board. In some embodiments, the foregoing internal power supply configured to supply power to an electronic element on the first circuit board may be disposed on the first circuit board, and an internal power supply configured to supply power to an electronic element on the second circuit board may be disposed on the second circuit board. Certainly, the internal power supply may be alternatively disposed on an independent circuit board. This is not limited in this embodiment of this disclosure.

Figure 7:
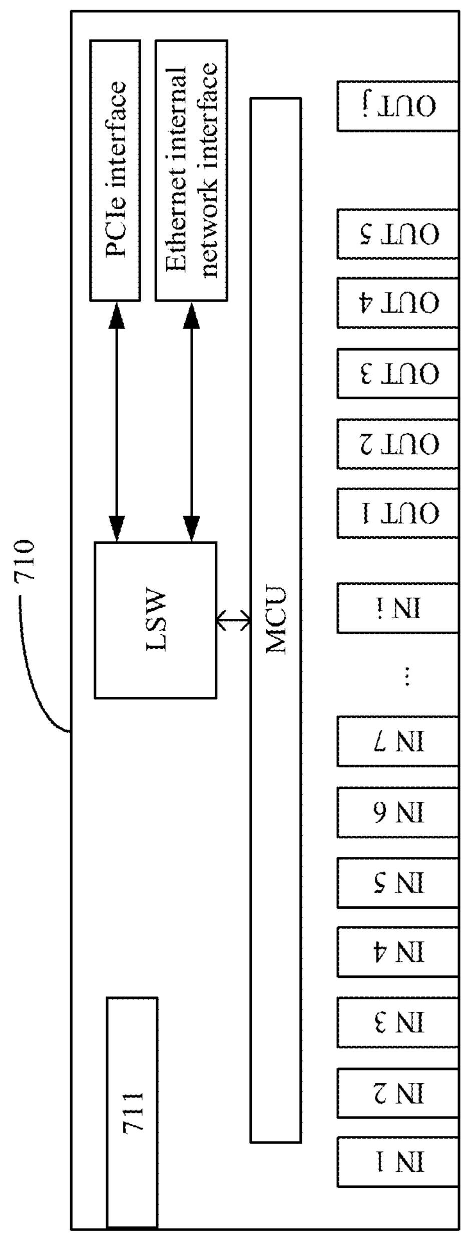
FIG. 7 is a schematic diagram of a first circuit board according to an embodiment of this disclosure.

In addition, an external power supply may be further disposed in the vehicle control apparatus, to supply power to an electronic element other than the electronic elements on the first circuit board and the second circuit board. For example, the external power supply may supply power to another vehicle component such as a wiper or a door lock in the vehicle. In this embodiment of this disclosure, the external power supply may be disposed on the first circuit board. Refer to a first circuit board 710 shown in FIG. 7. Certainly, the external power supply may be alternatively disposed on the second circuit board 320. However, usually, an MPU or an MCU in the second circuit board generates heat in a data processing process, and consequently a temperature of the second circuit board is relatively high. In this case, if the external power supply is further disposed on the second circuit board, the temperature of the second circuit board is excessively high.

In some embodiments, the external power supply may be disposed on an independent circuit board, that is, a power supply circuit board. In this way, after the external power supply is faulty, only the power supply circuit board may be replaced, to reduce maintenance costs of the vehicle control apparatus.

Figure 8:
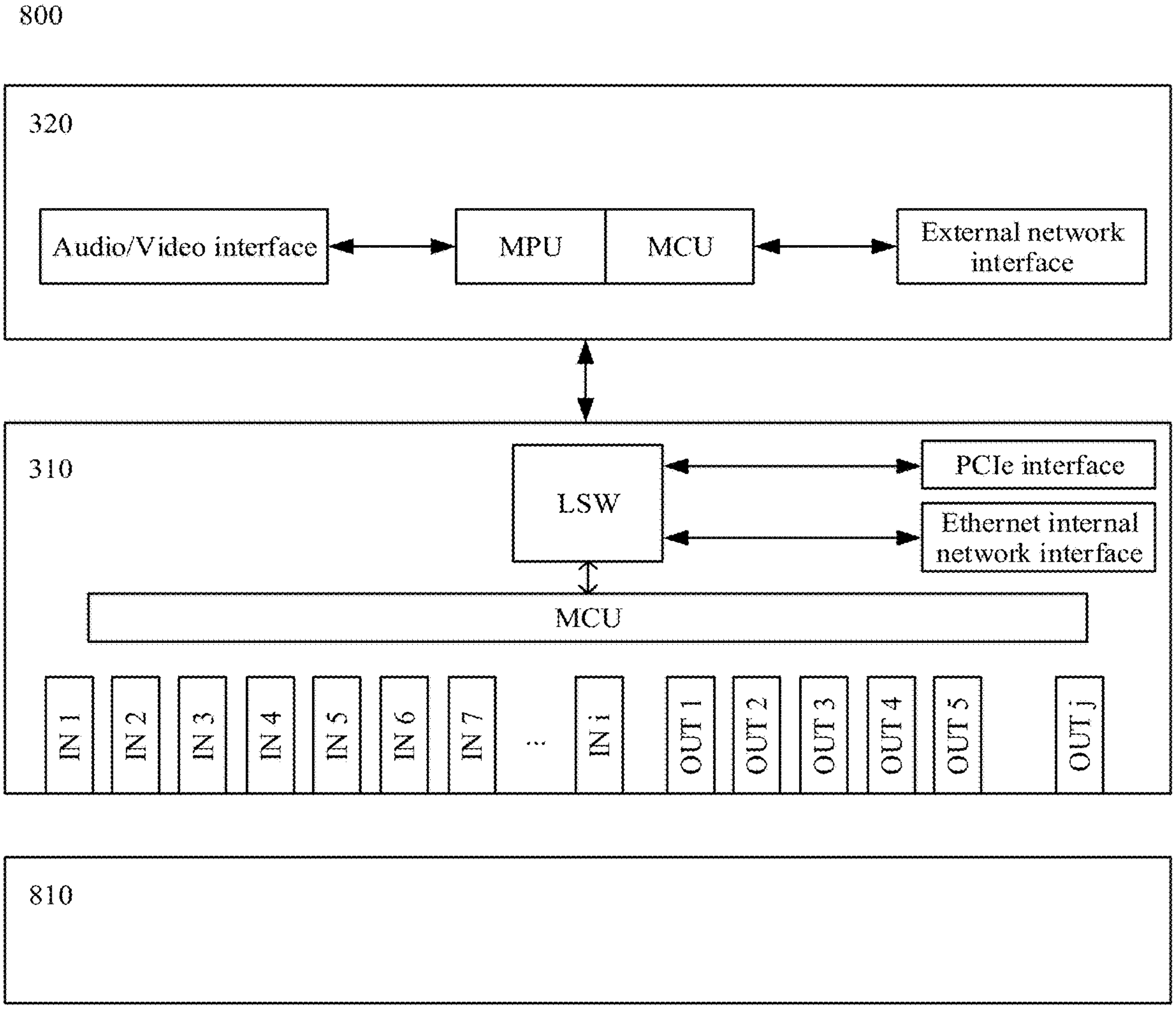
FIG. 8 is a schematic diagram of a vehicle control apparatus according to an embodiment of this disclosure.

In some embodiments, the power supply circuit board may be in a board-like structure, and may be, for example, a circuit board. For a specific structure, refer to a vehicle control apparatus 800 shown in FIG. 8. A power supply circuit board 810 is disposed in the vehicle control apparatus 800, to supply power to an electronic element other than electronic elements on a first circuit board and a second circuit board in a vehicle. It should be noted that the first circuit board and the second circuit board in the vehicle control apparatus 800 are described by using only the first circuit board 310 and the second circuit board 320 as an example. The first circuit board and the second circuit board in the vehicle control apparatus 800 each may be in any circuit board form described in this disclosure. For example, the first circuit board in the vehicle control apparatus 800 may be the first circuit board 210 or the first circuit board 710, and the second circuit board in the vehicle control apparatus 800 may be the second circuit board 220. This is not limited in this embodiment of this disclosure.

As described above, after one circuit board in a conventional vehicle control apparatus is divided into a plurality of circuit boards, the plurality of circuit boards may be deployed in the vehicle control apparatus in layers along a height direction of the vehicle control apparatus, to reduce a circuit board area of the vehicle control apparatus. Certainly, if it is not desired to increase a height of the vehicle control apparatus, the plurality of circuit boards may be alternatively deployed horizontally along a width or length direction of the vehicle control apparatus.

Figure 9:
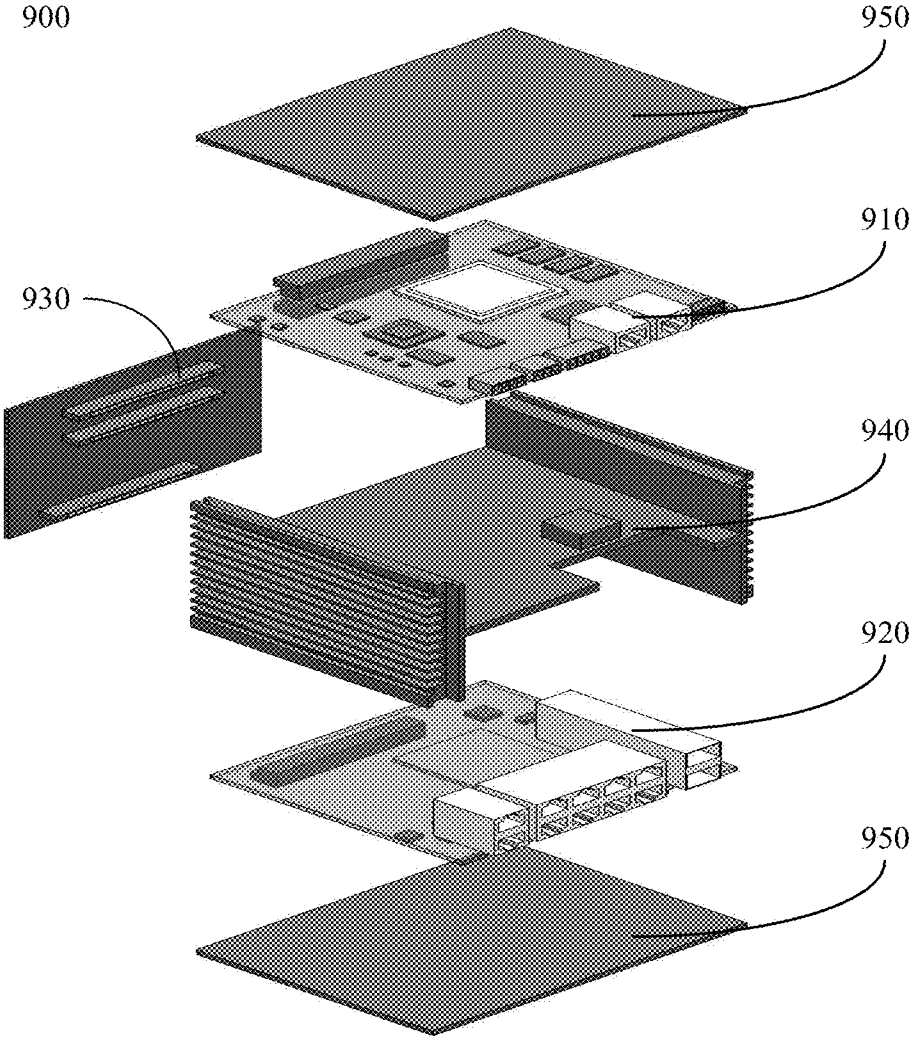
FIG. 9 is an exploded view of a hardware structure of a vehicle control apparatus according to an embodiment of this disclosure.

FIG. 9 is an exploded view of a hardware structure of a vehicle control apparatus according to an embodiment of this disclosure. A plurality of circuit boards in a vehicle control apparatus 900 shown in FIG. 9 are deployed in layers along a height direction of the vehicle control apparatus 900. It should be understood that a first circuit board 910 and a second circuit board 920 included in FIG. 9 each may be in any structure described above. For example, the first circuit board 910 may be the first circuit board 210, the first circuit board 310, or the first circuit board 710, and the second circuit board 920 may be the second circuit board 220 or the second circuit board 320.

The vehicle control apparatus 900 includes the first circuit board 910, the second circuit board 920, a mother board 930, a cooling plate 940, and a cover 950.

The first circuit board 910, the second circuit board 920, the mother board 930, and the cooling plate 940 are located inside the cover 950, and the first circuit board 910, the second circuit board 920, and the cooling plate 940 are deployed in layers along the height direction of the vehicle control apparatus 900.

The first circuit board 910 and the second circuit board 920 may be disposed on the mother board 930, and are connected to a circuit board in another expansion slot, such as a memory, on the mother board by using the mother board 930.

Correspondingly, the cooling plate 940 is located between the first circuit board 910 and the second circuit board 920, and is configured to dissipate heat for the first circuit board 910 and the second circuit board 920.

Figure 10:
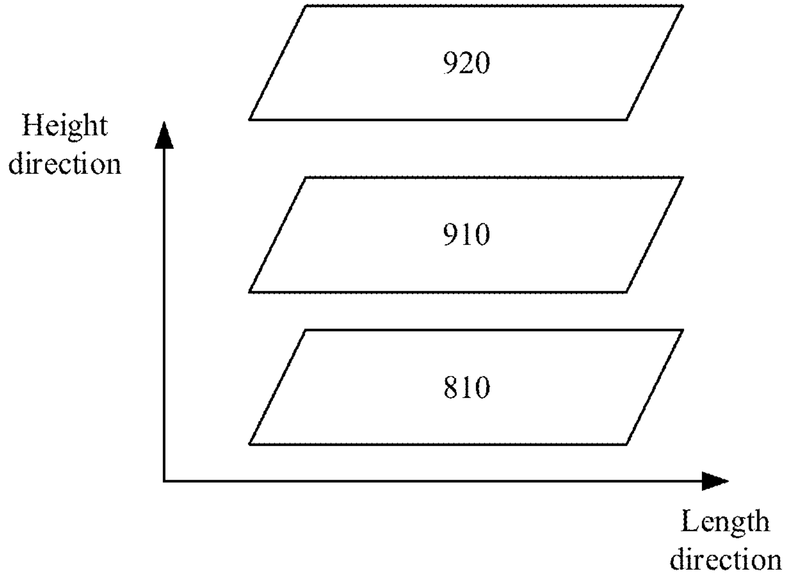
FIG. 10 is a schematic diagram of a deployment manner of circuit boards in a vehicle control apparatus according to an embodiment of this disclosure.

In some embodiments, if a power supply in the vehicle control apparatus is disposed on the power supply circuit board 810, to facilitate heat dissipation, the second circuit board 920 and the power supply circuit board 810 may be disposed on two sides of the first circuit board 910 in the height direction of the vehicle control apparatus. Refer to FIG. 10.

It should be noted that FIG. 9 shows the manner in which the first circuit board 910 is connected to the second circuit board 920 by using the mother board. The first circuit board 910 may be alternatively connected to the second circuit board 920 by using an inter-board connector or by using a flexible cable. A connection manner of the two circuit boards is not limited in this embodiment of this disclosure.

A person of ordinary skill in the art may be aware that, in combination with the examples described in the embodiments disclosed in this specification, units and algorithm steps can be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communicative connections may be implemented by using some interfaces. The indirect couplings or communicative connections between the apparatuses or units may be implemented in electrical, mechanical, or other forms.

The units described as separate components may or may not be physically separate, and components displayed as units may or may not be physical units, that is, may be located in one place, or may be distributed on a plurality of network units. Some or all of the units may be selected based on actual requirements to achieve the objectives of the solutions in the embodiments.

In addition, functional units in the embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this disclosure may be implemented in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A vehicle control apparatus, comprising:
- a communications bus;
- a plurality of first circuit boards each comprising an internal network interface, wherein the internal network interface is configured to communicatively couple the vehicle control apparatus to an in-vehicle network of a vehicle; and
- a second circuit board coupled to the plurality of first circuit boards via the communications bus, wherein the second circuit board comprises an external network interface configured to communicatively couple the vehicle control apparatus to a vehicle external network, wherein the second circuit board is configured to only communicate with the in-vehicle network through the plurality of first circuit boards, and wherein the plurality of first circuit boards is configured to only communicate with the vehicle external network through the second circuit board.

2. The vehicle control apparatus of claim 1, further comprising:
- at least one micro processing unit (MPU) disposed on the second circuit board and configured to process to-be-processed data; and
- a micro control unit (MCU) disposed on the second circuit board and configured to control a vehicle component in the vehicle.

3. The vehicle control apparatus of claim 1, further comprising a plurality of second circuit boards, wherein the plurality of second circuit boards comprises the second circuit board, and wherein each of the plurality of second circuit boards is configured to communicatively couple to the plurality of first circuit boards.

4. The vehicle control apparatus of claim 1, further comprising a plurality of second circuit boards comprising the second circuit board, wherein each of the plurality of first circuit boards is communicatively coupled to a part or all of the plurality of second circuit boards.

5. The vehicle control apparatus of claim 1, further comprising an interface disposed on the second circuit board and configured to transmit audio/video data.

6. The vehicle control apparatus of claim 1, wherein the internal network interface comprises an input/output (I/O) interface configured to communicate with a vehicle component in the vehicle using the in-vehicle network.

7. The vehicle control apparatus of claim 1, wherein the internal network interface comprises one or more of the following input/output interfaces:
- a Controller Area Network (CAN) input interface;
- a local interconnect network (LIN) input interface;
- an analog input interface;
- a digital input interface;
- a single edge nibble transmission (SENT) input interface;
- a Hall signal input interface;
- a low edge output interface;
- a high edge output interface;
- an H-bridge output interface;
- a brushless direct current motor (BLDCM) output interface;
- a current valve control interface;
- an Ethernet internal network interface; or
- a Peripheral Component Interconnect Express (PCIe) interface.

8. The vehicle control apparatus of claim 1, further comprising an external power supply disposed on at least one of the plurality of first circuit boards and configured to supply power to an electronic element in the vehicle other than electronic elements on the at least one plurality of the first circuit boards and the second circuit board.

9. The vehicle control apparatus of claim 1, further comprising a power supply circuit board, wherein the power supply circuit board comprises an external power supply configured to supply power to an electronic element in the vehicle other than electronic elements on the plurality of first circuit boards and the second circuit board.

10. A vehicle integrated/integration unit (VIU) comprising:
- a vehicle control apparatus configured to communicatively couple to an in-vehicle network of a vehicle and comprising:
  - a communications bus;
  - a plurality of first circuit boards each comprising an internal network interface, wherein the vehicle control apparatus is configured to communicatively couple to the in-vehicle network using the internal network interface; and
  - a second circuit board coupled to the plurality of first circuit boards via the communications bus, wherein the second circuit board comprises an external network interface configured to communicatively couple the vehicle control apparatus to a vehicle external network, wherein the second circuit board is configured to only communicate with the in-vehicle network through the plurality of first circuit boards, and wherein the plurality of first circuit boards is configured to only communicate with the vehicle external network through the second circuit board.

11. The VIU of claim 10, wherein the VIU is configured to implement, using the vehicle control apparatus, some or all electronic control functions of a plurality of vehicle components in the vehicle.

12. A vehicle comprising:

vehicle components;

an in-vehicle network; and a vehicle control apparatus communicatively coupled to the in-vehicle network, coupled to the vehicle components, and configured to control the vehicle components, wherein the vehicle control apparatus comprises:

a communications bus;

a plurality of first circuit boards each comprising an internal network interface, wherein the vehicle control apparatus is communicatively coupled to the in-vehicle network using the internal network interface; and a second circuit board coupled to the plurality of first circuit boards via the communications bus, wherein the second circuit board comprises an external network interface configured to communicatively couple the vehicle control apparatus to a vehicle external network, wherein the second circuit board is configured to only communicate with the in-vehicle network through the plurality of first circuit boards, and wherein the plurality of first circuit boards is configured to only communicate with the vehicle external network through the second circuit board.

13. The vehicle of claim 12, wherein the vehicle control apparatus further comprises:

at least one micro processing unit (MPU) disposed on the second circuit board and configured to process to-be-processed data in the vehicle control apparatus; and a micro control unit (MCU) disposed on the second circuit board and configured to control one or more of the vehicle components.

14. The vehicle of claim 12, wherein the vehicle control apparatus further comprises at least one micro processing unit (MPU) disposed on the second circuit board and configured to process to-be-processed data in the vehicle control apparatus.

15. The vehicle of claim 12, wherein the vehicle control apparatus further comprises a micro control unit (MCU) disposed on the second circuit board and configured to control one or more of the vehicle components.

16. The vehicle of claim 12, wherein the vehicle control apparatus further comprises a plurality of second circuit boards, wherein the plurality of second circuit boards comprises the second circuit board, and wherein each of the plurality of second circuit boards is communicatively coupled to the plurality of first circuit boards.

17. The vehicle control apparatus of claim 1, further comprising at least one micro processing unit (MPU) disposed on the second circuit board and configured to process to-be-processed data in the vehicle control apparatus.

18. The vehicle control apparatus of claim 1, further comprising a micro control unit (MCU) disposed on the second circuit board and configured to control a vehicle component in the vehicle.

19. The vehicle control apparatus of claim 1, further comprising:

at least one vehicle domain controller (DC) disposed on each of the plurality of first circuit boards; and at least one vehicle integrated unit (VIU) disposed on the second circuit board.

20. The vehicle of claim 12, wherein the vehicle control apparatus further comprises:

at least one vehicle domain controller (DC) disposed on each of the plurality of first circuit boards; and at least one vehicle integrated unit (VIU) disposed on the second circuit board.

* * * * *